US012807751B2

(12) United States Patent
Wilker et al.

(10) Patent No.: US 12,807,751 B2
(45) Date of Patent: Nov. 24, 2026

(54) ADHESIVES

(71) Applicant: Purdue Research Foundation, West Lafayette, IN (US)

(72) Inventors: Jonathan James Wilker, West Lafayette, IN (US); Michael Gabriel Mazzotta, Mashpee, MA (US); Michael North, Howell, MI (US); Amelia Putnam, Mansfield, GA (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/426,111

(22) Filed: Jan. 29, 2024

(65) Prior Publication Data

US 2024/0166786 A1 May 23, 2024

Related U.S. Application Data

(62) Division of application No. 16/959,283, filed as application No. PCT/US2017/069167 on Dec. 31, 2017, now Pat. No. 11,884,757.

(51) Int. Cl.
*C08F 220/18* (2006.01)
*C08K 5/053* (2006.01)
*C09J 133/02* (2006.01)
*C09J 177/00* (2006.01)

(52) U.S. Cl.
CPC ....... *C08F 220/1804* (2020.02); *C09J 177/00* (2013.01); *C08F 2800/10* (2013.01); *C08K 5/053* (2013.01); *C09J 133/02* (2013.01)

(58) Field of Classification Search
CPC combination set(s) only.
See application file for complete search history.

(56) References Cited

U.S. PATENT DOCUMENTS 6,143,464 A * 11/2000 Kawauchi ............. B41C 1/1008 430/286.1
10,982,121 B2 * 4/2021 Chung ................. C09J 133/066
11,130,886 B2 * 9/2021 Wilker ....................... C09J 7/35
2003/0087338 A1 5/2003 Messersmith et al.
2007/0208141 A1 9/2007 Shull et al.
2008/0169059 A1 7/2008 Messersmith et al.
2009/0036611 A1 2/2009 Wilker et al.
2010/0120923 A1 * 5/2010 Stewart ................. A61L 24/043 514/772.1
2011/0130465 A1 6/2011 Dalsin et al.
2011/0287067 A1 11/2011 Stewart
2012/0156164 A1 6/2012 Park et al.
2013/0189313 A1 * 7/2013 Stewart ............... A61L 24/0073 623/23.62
2013/0248109 A1 9/2013 Grubbs et al.
2017/0123106 A1 * 5/2017 Chien ................... C08F 220/20
2018/0118978 A1 5/2018 Yabu et al.
2018/0298249 A1 10/2018 Wilker et al.
2020/0190362 A1 6/2020 Yabu et al.

FOREIGN PATENT DOCUMENTS

EP 1935933 A1 6/2008
WO 2015175665 A1 11/2015
WO 2016190400 A1 12/2016
WO 2019133023 A1 7/2019

OTHER PUBLICATIONS

IP Australia, Examination Report 1, Application No. 2017445170, dated Mar. 12, 2021, AU.
European Patent Office, Supplementary European Search Report, European Patent Application No. 17936850, dated Jul. 27, 2021, DE.
Yang et al., The effect of molecular composition and crosslinking on adhesion of a bio-inspired adhesive, Polymer Chem 6: 3121-3130 (2015), GB.
Glass et al., Enhanced reversible adhesion of dopamine methacrylamide-coated elastomer microfibrillar structures under wet conditions, Am Chem Soc'y 25(12): 6607-6612 (2009), US.
Penman & Sanderson, A method for the determination of uronic acid sequence in alginates, Carbohydrate Research 25: 273-282 (1972), GB.
Voragen et al., Polysaccharides in Ullmann's Encyclopedia of Industrial Chemistry, vol. 29, pp. 417-473, published by Wiley-VCH Verlag Gmbh & Co, KGaA (2003), DE.
International Searching Authority, International Search Report, PCT Application No. PCT/US2017/069167, dated Mar. 29, 2018, US.
International Searching Authority, Written Opinion of the International Searching Authority, PCT Application No. PCT/US2017/069167, dated Mar. 29, 2018, US.
Hong et al., Staple alginate gel prepared by linkage exchange from iconic to covalent bonds, Advanced Healthcare Materials 5: 75-59 (2015), US.
Moulay, Dopa/catechol-tethered polymers: bioadhesives and biomimetic adhesive materials, Polymer Reviews 54: 436-513 (2014), US.

* cited by examiner

*Primary Examiner* — Katarzyna I Kolb
(74) *Attorney, Agent, or Firm* — Reichel Stohry Dean LLP; Natalie J. Dean

(57) ABSTRACT

The invention relates to biomimetic adhesive compositions emulating mussel adhesive proteins, wherein multiple chains of a copolymer are interlinked via specific hydrogen bonds and/or ligand-metal-ligand bonds, which serve as sacrificial breakable bonds upon mechanical stress and thereby effectively dissipate the mechanical energy. Accordingly, toughened adhesive compositions with improved ductility and strength may be obtained.

12 Claims, 3 Drawing Sheets

ADHESIVES

PRIORITY

The present application is a divisional of, relates to and claims the priority benefit of U.S. patent application Ser. No. 16/959,283 filed Jun. 30, 2020, and which issues as U.S. Pat. No. 11,884,757 on Jan. 30, 2024, which is related to, claims the priority benefit of, and is a 35 U.S.C. § 371 national stage application of International Patent Application Number. PCT/US2017/069167, filed Dec. 31, 2017. The entire contents of each of the aforementioned priority applications and patent are expressly incorporated herein by reference in their entireties.

FIELD OF INVENTION

This invention relates to adhesive compositions based on biomimetic copolymer systems which simultaneously exhibit favorable strength and ductility, and to methods of manufacturing the same.

Specifically, the present invention relates to biomimetic adhesive compositions emulating mussel adhesive proteins, wherein co-monomers comprising breakable bonds are incorporated to dissipate energy upon mechanical stress on the adhesive joint.

BACKGROUND OF THE INVENTION

In the field of adhesive compositions, there has always been an interest to develop adhesives which combine both high ductility and high strength. Ductility is important to provide a means of distributing out mechanical stresses across the entirety of a bond, instead of concentrating at the edges. Such stress distribution prevents sudden bond failure. However, this property usually comes at the expense of material strength. Such low modulus materials tend to be weak. The ideal adhesive would be both strong and ductile, which is the characteristic of toughness. Having these parameters seemingly at odds with each other, there has been some, but not much, effort to fill the technology gap. Rubber toughened epoxy-based adhesives can exhibit degrees of toughness, although segregation between the rubber and epoxy polymer portions limits formulation. Furthermore, there has not yet been any study in which strength and ductility have been incorporated into an adhesive, systematically, in order to find where performance is maximized.

FIG. 1 contrasts two classical cases, showing plots of force versus extension in which two substrates, bonded in lap shear, are pulled apart until failure. The polystyrene-based adhesive depicted on the left is an example of a high strength and brittle system. Specifically, it has been demonstrated that such a poly[(3,4-dihydroxystyrene)-co-styrene] polymer, a simplified biomimetic system emulating mussel adhesive proteins, is an adhesive of substantial strength, in some cases even exceeding that of commercial adhesives such as "Super Glue." However, this high strength means that the material is also brittle. Plot A shows that the bond strength becomes very high (~70 N), followed by a sudden and sharp drop, indicating joint failure. On the other hand, the adhesive composition depicted on the right is an exemplary acrylate-based adhesive polymer as disclosed in WO 2017/004174 A1. In said terpolymer system, short chains of polyethylene glycol (PEG) are used to impart flexibility, ductility, and decreased polymer modulus. Incorporation of PEG helps to distribute mechanical stresses across the joint and thus increase adhesion. Excessive amounts of PEG and hence high ductility, however, makes the overall adhesive system weak cohesively, thus yielding a poor adhesive of relatively low performance. The corresponding plot B demonstrates that bond failure occurs at a lower adhesion force (~18 N), but is also much more gradual, taking a longer time and greater extension between substrates. In situations like these, there is often adhesive still bound to each substrate even after they have been pulled out of contact (see lower right).

The ideal adhesive would have the properties of curve C, exhibiting high toughness, which is a junction of being simultaneously strong and ductile. Such a material can both create bonds of high adhesion strength and also generate a high work of adhesion (i.e., area under curve C).

However, in view of the above-described trade-off relationship between ductility and strength, an ideal, tough adhesive does not yet exist. Accordingly, it would be desirable to provide adhesive compositions which exhibit improved toughness (i.e. combine adhesive strength and ductility) and ideally a chemical approach to create tough adhesives, which could potentially enable such a concept to be applied to several other adhesive systems.

SUMMARY OF THE INVENTION

The present invention solves these objects with the subject matter of the claims as defined herein. The advantages of the present invention will be further explained in detail in the section below and further advantages will become apparent to the skilled artisan upon consideration of the invention disclosure.

The present inventors found that a strategy to creating such an ideal adhesive is the incorporation of low energy "breakable" bonds into the copolymer system, which break before the main covalent bonds forming the polymer as the adhesive joint is stressed, thereby dissipating mechanical energy so that the two substrates adhered to each other than remain attached. For this purpose, hydrogen bonds and metal-ligand bonds are envisaged.

Generally speaking, the present invention therefore relates to an adhesive composition comprising multiple chains of a copolymer including a first co-monomer selected from one of dopamine methacrylamide, 3,4-dihydroxyphenylalanine or 3,4-dihydroxystyrene, and a second co-monomer comprising a pendant first functional group; wherein at least two of the first functional groups of different copolymer chains are interlinked via: a neutral hydrogen bond; a first additive comprising second and third functional groups, each of which form neutral hydrogen bonds with said first functional groups of different copolymer chains; or a second additive, which is a metal ion, to which said first functional groups of different copolymer chains are bound through a ligand-metal-ligand bond, the first functional groups forming the ligands; wherein the neutral hydrogen bonds are formed between functional groups which are capable of both functioning as hydrogen bond donors and acceptors.

In this system, the neutral hydrogen bonds or the metal-ligand interaction provide for the breakable bonds which serve as sacrificial, predetermined breaking points upon exertion of mechanical stress on the adhesive joint.

A further aspect of the present invention relates to a method of manufacturing an adhesive composition, comprising the steps of: copolymerizing a first co-monomer selected from one of dopamine methacrylamide, 3,4-dihydroxyphenylalanine or 3,4-dihydroxystyrene, and a second co-monomer comprising a pendant first functional group; dissolving the copolymer; and dissolving a first additive comprising second and third functional groups, each of which are capable of forming neutral hydrogen bonds with the first functional groups of different copolymer chains, wherein the neutral hydrogen bonds are formed between functional groups which are capable of both functioning as hydrogen bond donors and acceptors, and mixing the solutions of the copolymer; or adding a second additive, which is a metal ion, capable of interlinking the first functional groups of different copolymer chains through a ligand-metal-ligand bond, the first functional groups forming the ligands, to the copolymer solution.

Preferred embodiments of the formulation according to the present invention and other aspects of the present invention are described in the following description and the claims.

DETAILED DESCRIPTION OF THE INVENTION

Figure 1:
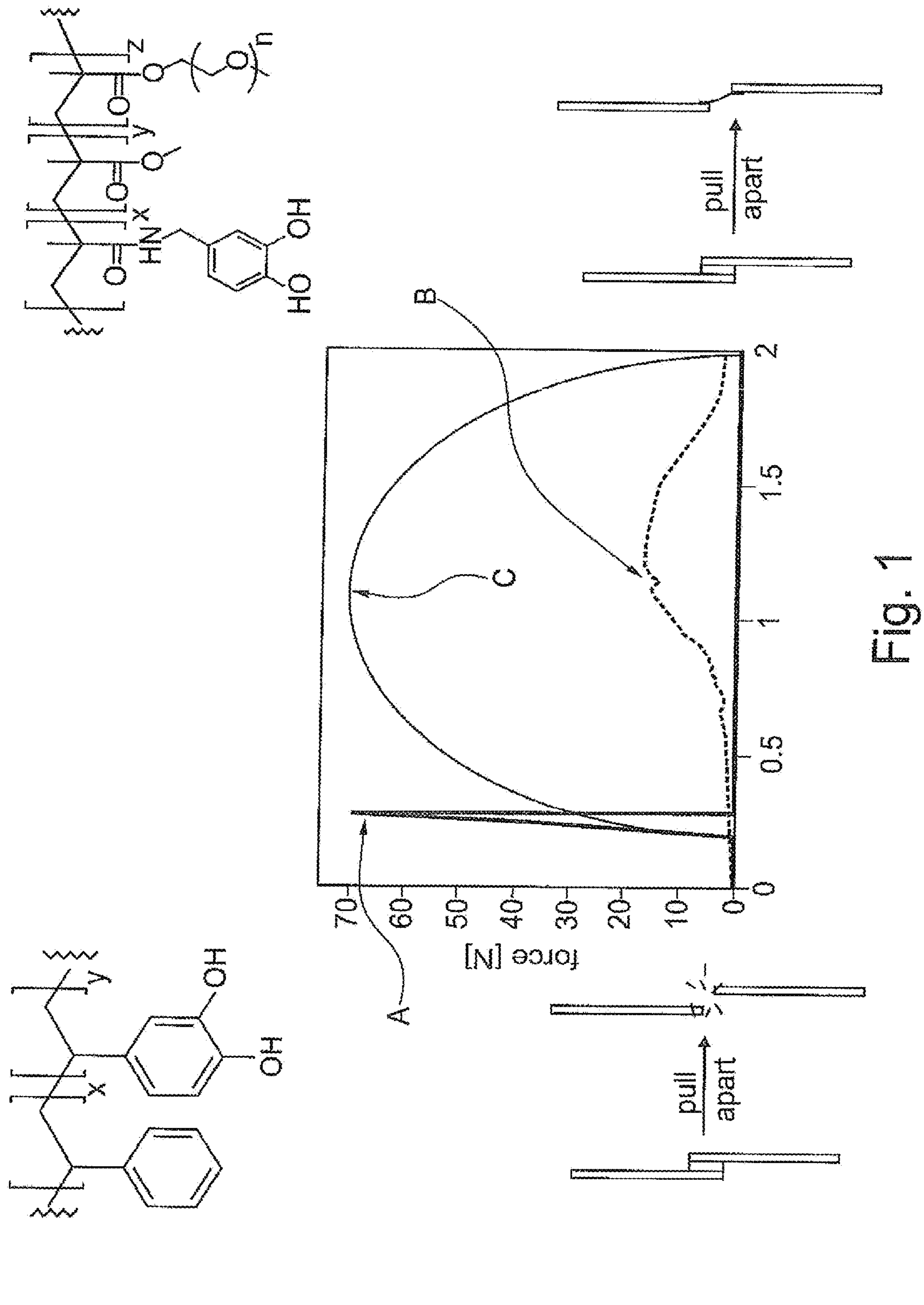
FIG. 1 shows a graph displaying characteristic force vs. extension plots curves of a strong and brittle adhesive (A), a ductile but weak adhesive (B) and an ideal tough adhesive (C).

For a more complete understanding of the present invention, reference is now made to the following description of the illustrative embodiments thereof.

In a first embodiment, the present invention relates to an adhesive composition comprising multiple chains of a copolymer including a first co-monomer selected from one of dopamine methacrylamide, 3,4-dihydroxyphenylalanine or 3,4-dihydroxystyrene, and a second co-monomer comprising a pendant first functional group; wherein at least two of the first functional groups of different copolymer chains are interlinked via: a neutral hydrogen bond; a first additive comprising second and third functional groups, each of which form hydrogen bonds with said first functional groups of different copolymer chains; or a second additive, which is a metal ion, to which said first functional groups of different copolymer chains are bound through a ligand-metal-ligand bond, the first functional groups forming the ligands, wherein the neutral hydrogen bonds are formed between functional groups which are capable of both functioning as hydrogen bond donors and acceptors.

The first co-monomer selected from dopamine methacrylamide or 3,4-dihydroxyphenylalanine or 3,4-dihydroxy styrene, of which dopamine methacrylamide is preferred, is a biomimetic cross-linkable monomer derived from mussel adhesive proteins and mainly provides for the adhesion in the resulting compositions.

In preferred embodiments, the first co-monomer present in a proportion of about 10 mol % to about 50 mol %, preferably in a proportion of about 20 mol % to about 40 mol %, further preferably in a proportion of about 28 mol % to about 36 mol %, based on the total molar amounts of co-monomers present in the copolymer.

In preferred embodiments, the second co-monomer is present in a proportion of about 50 mol % to about 90 mol %, preferably in a proportion of about 60 mol % to about 80 mol %, further preferably in a proportion of about 64 mol % to about 72 mol %, based on the total molar amounts of co-monomers present in the copolymer.

A hydrogen bond is commonly defined as any cohesive interaction D-H· · · A, where H (hydrogen) carries a positive and A (i.e. hydrogen bond (HB) acceptor) a negative (partial or full) charge and the charge on D (i.e. hydrogen bond donor) is more negative than on H.

While not being limited thereto, functional groups which are capable of both functioning as hydrogen bond donors and acceptors typically comprise functional groups comprising one or more lone electron pairs at a heteroatom (hydrogen bond-accepting) and hydrogen atoms attached to a heteroatom (hydrogen bond-donating). Specific examples thereof include, but are not limited to carboxylic acid groups, hydroxyl groups, primary or secondary amides, thiourea, urea, thiol, and guanidinium groups.

The wording "neutral hydrogen bond" as employed herein, denotes hydrogen bonds, wherein A and D are not fully charged, which may include double-charge assisted hydrogen bonds, but excludes fully ionic bonds formed upon proton transfer and also ionized (or doubly charged) hydrogen bonds (e.g., –D: · · · H-A+). A concept which allows to predict whether a hydrogen bond formed between different HB donors and acceptors forms neutral or ionized bonds is based on the so-called "$pK_\alpha$ slide rule" developed by Gilli et al. (see e.g. P. Gilli et al., Acc. Chem. Res. 2009, 42 (1), 33-44), which describes the strength and quality of hydrogen bonds on the basis of acid-base characteristics.

In a first approximation, neutral hydrogen bonds are obtained if the following relationship is met: $\Delta pK_\alpha = pK_\alpha(DH) - pK_\alpha(AH^+) > 0$, wherein $pK_\alpha(DH)$ is the $pK_\alpha$ value of the hydrogen bond donor and pKa $(AH^+)$ is the pKa value of the hydrogen bond acceptor (in aqueous solutions at room temperature). On the other hand, if ΔpKa is negative, which corresponds to an interaction between a strong HB donor and a strong HB acceptor, doubly charged hydrogen bonds tend to be formed. For example, carboxylic acids typically exhibit a $pK_\alpha(DH)$ in the range of 2 to 5. Hydrogen bonds with alcohols ($pK_\alpha(AH+) \approx -5$ to $-2$, will result in a $\Delta pK_\alpha$ in the range of about 4 to 10. On the other hand, a combination of carboxylic acid with an amine ($pK_\alpha(AH+) \approx 10$ to 11) will lead to a negative $\Delta pK_\alpha$ (e.g. formation of ammonium-carboxylate bonds). In general, $pK_\alpha$ values may be determined by methods known to the skilled artisan.

While not being limited thereto, a few examples of hydrogen bonds formed between exemplary functional groups, i.e. a dimer carboxylic acid (a), acid-acid links formed via an additive (b), and hydrogen bonds formed between carboxylic acid monomers and a diol additive (c), are illustrated in the following formulae, wherein the indices y, n and the group R may be appropriately selected by the skilled artisan:

(a)

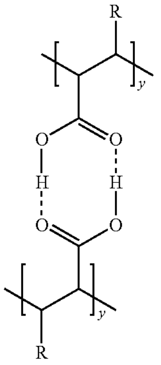

(b)

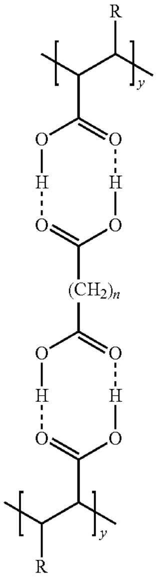

(c)

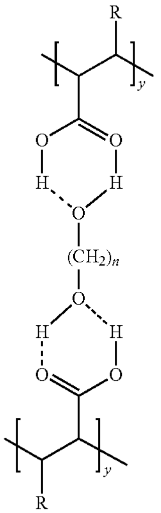

In general, the hydrogen bonds should be strong enough to dissipate the energy, but also be weaker than the main covalent bonds forming the polymer in order to obtain an improved balance of ductility and strength. For this purpose, it is preferable that the $\Delta pK_{\alpha}$ is between 2 and 18, especially preferably between 3 and 16.

In the case where a first additive is added, the hydrogen bond is preferably formed by a carboxylic acid, wherein the latter may be used as the first, second and third functional group. Also preferred are embodiments, wherein a carboxylic acid is the first functional group and the second and third functional groups are preferably independently selected from any of hydroxyl, urea, thiourea, amide, guanidinium, carboxylic acid, and thiol. Alternatively, it may be preferred that the first functional group is selected from any of hydroxyl, urea, thiourea, amide, guanidinium, carboxylic acid, and thiol, and the second and third functional groups are carboxylic acids. From the group of functional groups which complement carboxylic acids, alcohols, urea, thiourea, guanidinium and amides are more preferred in view of the resulting $\Delta pK_{\alpha}$ and the thus obtained enhancement strength and ductility. In a further preferred embodiment, the first functional group is a carboxylic acid and the second and third functional groups are hydroxyl groups, or wherein the first functional group is a hydroxyl group and the second and third functional groups are carboxylic acids. As an example of a first additive bearing hydroxyl groups as the second and third functional groups, a polyol, preferably a diol comprising 1 to 12 carbon atoms, such as ethylene glycol, may be mentioned.

As preferred second co-monomers, which may be used in combination with the above-described first additives to provide for carboxylic acid groups, methacrylic acid or acrylic acid may be mentioned, of which acrylic acid is especially preferred.

In the case where the at least two of the first functional groups of different copolymer chains are interlinked via a neutral hydrogen bond, it is preferable that the first functional group is capable of both functioning as a hydrogen bond donor and acceptor (such as a carboxylic acid, for example, which is capable of forming a carboxylic acid dimer). In addition, it has to be ensured that in the cured form of the copolymer, said first functional groups of the different copolymer chains are sufficiently close to each other to enable formation of hydrogen bonds, which may be achieved by appropriate spacer groups (including, but not limited to alkyl chains, for example) in the second comonomer.

As an alternative to hydrogen bonds, ligand-metal-ligand interactions may be established by addition of the second additive, to which said first functional groups of different copolymer chains are bound through a ligand-metal-ligand bond, the first functional groups forming the ligands.

While not being limited thereto, a few examples of such bonds, i.e. a carboxylate-metal-carboxylate link (d), acrylamide-type complex bonds (e), and amine-type complex bonds (f), are illustrated in the following formulae, wherein the indices y, the charge n and the group R may be appropriately selected by a person skilled in the art in view of the present disclosure:

(d)

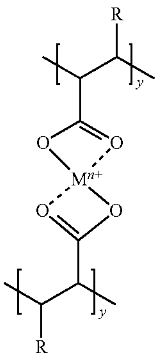

-continued (e)

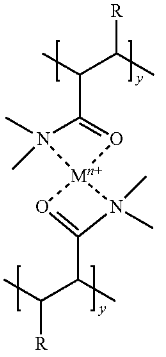

(f)

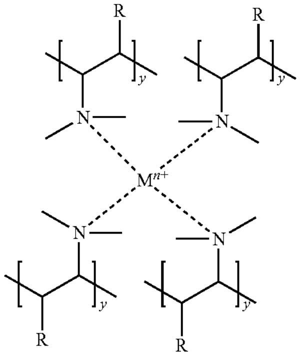

Said second additive is preferably a metal ion selected from alkaline earth metal ions or transition metal ions, further preferably from any one of an ion of Cu, Cd, Co, Ni, Fe, Zn, Ag, Mn or Cr, which may be added to the copolymer compositions as aqueous solutions of salts, which may be suitably selected by the skilled artisan.

While not being limited thereto, the first functional groups to be used with said second additives are preferably selected from carboxylate, hydroxyl, amide or amine groups, and preferably represent carboxylate groups.

In general, it is preferred that the number-average molecular weight ($M_n$) of the copolymer is at least 5000 g·mol$^{-1}$, further preferably between 5500 and 15000 g·mol$^{-1}$ from the viewpoint of favourable bulk adhesion.

While not being particularly limited, the polydispersity indices (PDIs) of the copolymer range between 1.3 to 2.0, preferably between 1.4 to 1.9.

It is understood that the above-described concepts of introducing breakable bonds may be combined in a single adhesive composition or even a single copolymer in any combination.

Furthermore, it is understood that the copolymer may comprise further co-monomers apart from the above-defined first and second co-monomers, although in embodiments, a copolymer consisting of the above-described first and second co-monomers may be preferable.

Finally, the adhesive composition may comprise further conventional additives known in the art, such as e.g. emulsifiers, pigments, fillers, curing agents, thickeners, humectants, wetting agents, biocides, adhesion promoters, colorants, tackifying resins, UV stabilizers, waxes, antioxidants, and the like.

In a second embodiment, the present invention relates to a method of manufacturing an adhesive composition, comprising the steps of: copolymerizing a first co-monomer selected from one of dopamine methacrylamide, 3,4-dihydroxyphenylalanine or 3,4-dihydroxystyrene, and a second co-monomer comprising a pendant first functional group; dissolving the copolymer; and dissolving a first additive comprising second and third functional groups, each of which are capable of forming neutral hydrogen bonds with the first functional groups of different copolymer chains, and mixing the solutions of the copolymer and the first additive; or adding a second additive, which is a metal ion, capable of interlinking the first functional groups of different copolymer chains through a ligand-metal-ligand bond, the first functional groups forming the ligands.

The copolymerization may be brought about according to methods known in the art.

While not being limited thereto, curing of the adhesive composition may be brought about after application on the adherend(s), for example by leaving the composition to stand in air at room temperature, or at an elevated temperature of between 30 to 80° C., for example.

Overall, it will be appreciated that the preferred features of the first and second embodiments specified above may be combined in any combination, except for combinations where at least some of the features are mutually exclusive.

Polymer characterization was carried out using $^1$H-MNR spectroscopy and gel permeation chromatography (GPC). The percentage of monomers in the backbone corresponded with the initial monomer feeds. Monomer ratios for the polymers were determined by integration of the aromatic region (δ 6.2-6.7 ppm) to give dopamine methacrylamide content and the backbone region (δ 0-2.4 ppm) for acrylic acid content. Molecular weight was determined by GPC using a Polymer Laboratories PR-GPC20 with the eluent tetrahydrofuran (THF). The lap shear measurements may be carried out in accordance with ASTM D1002.

EXAMPLES

Comparative Example 1

An adhesive copolymer was obtained via radical polymerization of dopamine methacrylamide and tert-butyl acrylate, followed by subsequent trifluoroacetic acid-mediated hydrolysis of the tert-butyl ester. Approximately 33 mol % dopamine methacrylamide monomer was targeted.

Synthesis of Poly {[Dopamine Methacrylamide]-Co-[Tert-Butyl Acrylate]}

Dopamine methacrylamide (3.0 g, 13.5 mmol), tert-butyl acrylate (4.0 mL, 27.3 mmol) and AIBN (31.6 mg, 0.192 mmol) were dissolved into dimethylformamide (24 mL) in a flame-dried Schlenk flask. After sparging with argon for 15 min at room temperature, the flask was placed into a 70° C. oil bath for 2 d. The reaction mixture became a viscous solution. The flask was removed from the oil bath and 1 mL of methanol was added to quench the reaction. To the cooled reaction was added dichloromethane (~10 mL) for dilution. The solution was then poured into excess ether (=200 mL) to precipitate a white polymer. The product was reprecipitated two additional times in dichloromethane/ether. Sonication along with minimal methanol was often necessary to solubilize the polymer. The product was dried in vacuo for two nights yielding 5.8 g (78%) of pure polymer.

Synthesis of Poly {[Dopamine Methacrylamide]-Co-[Acrylic Acid]}

Poly {[dopamine methacrylamide]-co-[tert-butyl acrylate]} (2.2 g, 13.9 mmol) was dissolved into dichloromethane (≈30 mL) in a Schlenk flask. After sparging with argon for 15 min at room temperature, 10 mL trifluoroacetic acid was added dropwise and stirred at ambient under argon for 1 d. A solid mass of polymer precipitate resulted and was recovered by decanting off the solution. The product was dissolved in methanol and precipitated with ether. The product was reprecipitated two additional times in methanol/ether. The product was dried in vacuo for two nights yielding 1.6 g (96%) of pure polymer.

A Varian Inova-300 MHz spectrometer was used to record $^1$H-NMR spectra. Monomer ratios were determined by integration of the aromatic region (δ 6.2-6.7 ppm) to give dopamine methacrylamide content and the backbone region (δ 0-2.4 ppm) for acrylic acid content. Molecular weights were found by gel permeation chromatography (GPC) using a Polymer Laboratories PL-GPC20 with eluent tetrahydrofuran (THF). The monomer tert-butyl acrylate was purchased from Sigma Aldrich and purified using an alumina column. Trifluoroacetic acid was also purchased from Sigma Aldrich and was stored under argon while not in use. All other chemicals used were purchased from Sigma Aldrich and used as received. Synthesis of the dopamine methacrylamide monomer followed a published procedure and was characterized by $^1$H-NMR spectroscopy. All polymers were prepared by free radical polymerization under an inert argon atmosphere using typical Schlenk techniques. The radical initiator, azobisisobutyronitrile (AIBN), was recrystallized from methanol and dried in vacuo prior to use. Dimethylformamide (DMF) solvent was degassed with bubbling argon for at least 15 min prior to starting a reaction.

In general, polymer characterization was carried out using NMR spectroscopy and gel permeation chromatography (GPC). The percentage of monomers in the backbone corresponded with the initial monomer feeds. The dopamine methacrylate content ranged from 28 to 37 mol %. The number-average molecular weights (Mn) ranged from 6,000 $g \cdot mol^{-1}$ to 14,000 $g \cdot mol^1$ with polydispersity indices (PDIs) of 1.4 to 1.9 for all tested polymers.

Adhesion Study on Aluminium Substrates

For lap shear tests, adherends of 8.89 cm×1.27 cm×0.318 cm were precision cut using a water jet system from a sheet of aluminium 6061-T6 purchased at Farmer's Copper. Holes with a diameter of 0.633 cm were drilled 0.80 cm from the top using a drill press. The adherends were cleaned according to the ASTM D2651 standard method, followed by washes in boiling, deionized water and methanol. For adhesion tests, the polymers were dissolved at 0.15 g polymer g·mL-1 in methanol, often using a sonicator. Polymer solutions (45 μL) were deposited onto the adherends, and then overlapped (1.2×1.2 cm) to form single lap-joint configurations. The use of a homebuilt jig ensured consistency of the overlap area and alignment of the joints. Two Teflon blocks on either side of the joint were pushed together to precisely align the bonded substrates. Specimens were allowed to cure for 1 h at room temperature followed by 22 h at 70° C. and then 1 h at room temperature before testing. Adhesion is defined as the maximum load at failure divided by the glue-covered substrate overlap area.

Example 1

Example 1 was prepared and tested in accordance to Comparative Example 1, with the exception that 15 μL of an ethylene glycol solution has been added to the polymer solution upon deposition onto the adherends, resulting in a molar amount of ethylene glycol of 45 mol % (relative to acrylic acid).

Figure 2A:
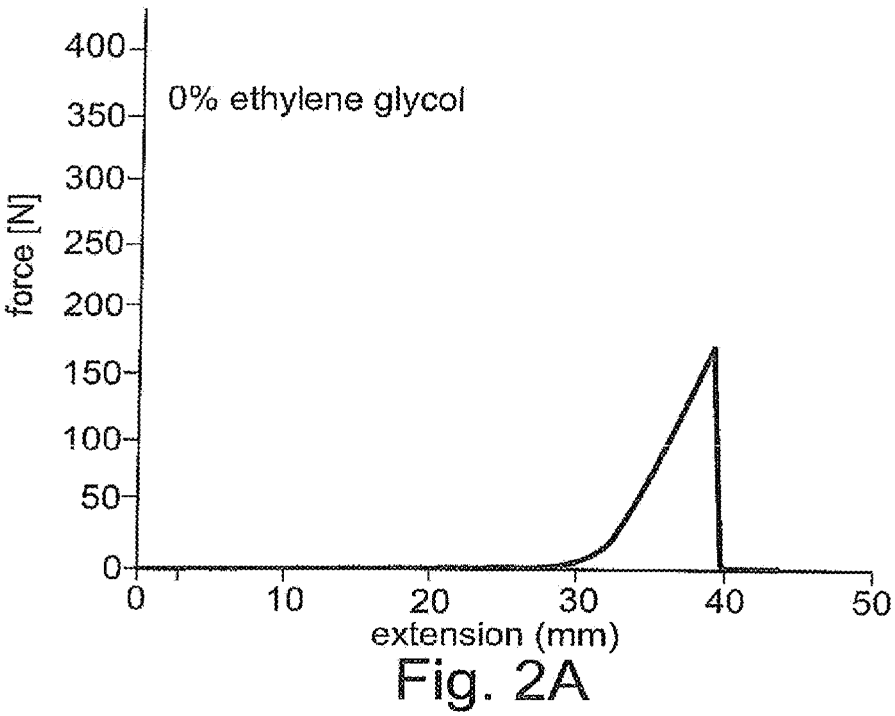
FIG. 2A shows a force vs. extension plot of an adhesive composition according to Comparative Example 1.
Figure 2B:
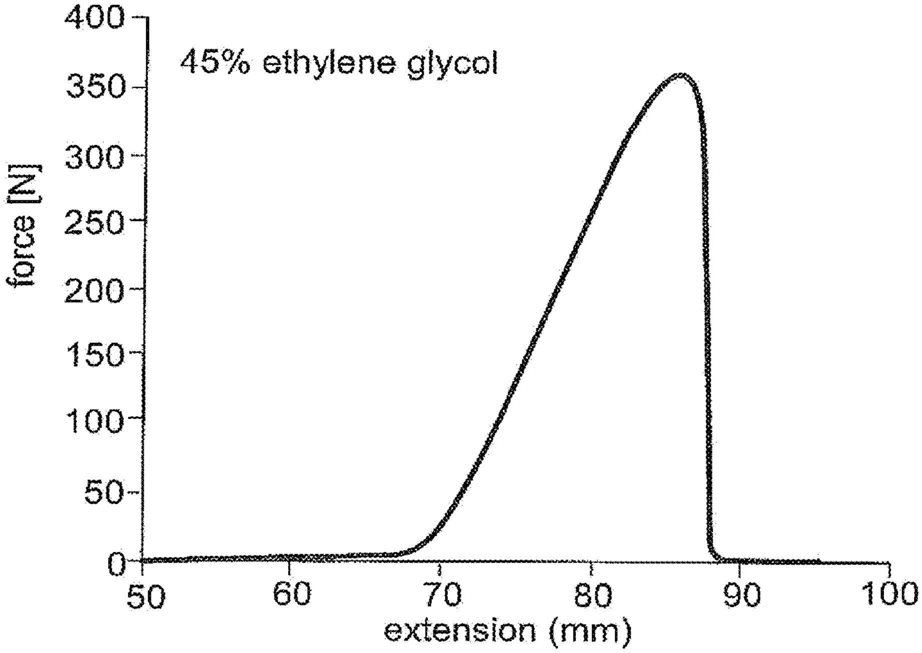
FIG. 2B shows a force vs. extension plot of an adhesive composition according to Example 1 of the present invention.

The results of the lap shear test using the compositions of Comparative Example 1 and Example 1 are shown in FIGS. 2A and 2B, which depict curves resulting from the raw data where bonded pairs of substrates are pulled until failure. The force vs. extension curves from lap shear adhesion testing of the adhesive copolymers show that the polymer alone, i.e. Comparative Example 1, exhibits brittle fracture, since the carboxylic groups of acrylic acid are not interlinked by breakable bonds, presumably in view of the steric hindrance through the dopamine methacrylamide (FIG. 2A). On the other hand, incorporation of ethylene glycol molecules enables formation of hydrogen bonds between acrylic acid monomer and thus induces ductility into the system (FIG. 2B). In addition to this brittle to ductile transition, comparing the mechanical strength of the polymer alone (1.22±0.27 MPa) to that with the addition of ethylene glycol (2.60±0.52 MPa) indicates a substantial increase in the overall strength of the material. Therefore, it has been shown that ductility can be induced with no compromise to the mechanical strength of the material, contrary to conventional adhesive systems, wherein ductility can be incorporated only at the expense of the mechanical strength of the material.

Comparative Example 2

Comparative Example 2 was prepared according to Example 1, with the exception that 45 mol % dimethoxyethane, an analog of ethylene glycol possessing no hydroxyl groups, have been added instead of ethylene glycol. Addition of this polymer produced essentially no increase in the mechanical strength (1.34±0.49 MPa). No transition from brittle to ductile fracture was observed, indicating that the ether groups of dimethoxyethane, which may only function as hydrogen bond-accepting groups, cannot provide the breakable bonds necessary to increase the ductility and strength of the adhesive composition.

Comparative Example 3

In order to gain insights into the degree to which this hydrogen bonding between diol and carboxylate groups affects the bulk mechanical properties of the material, a control experiment was performed using a poly {[dopamine methacrylamide]-co-[methyl acrylate]} polymer. The methyl ester analog was expected be less prone to hydrogen bonding with the absence of carboxylate groups featured in the acrylic acid monomer, and thus the effect of ethylene glycol was expected to be diminished.

Synthesis of Poly {[Dopamine Methacrylamide]-Co-[Methyl Acrylate]}

Dopamine methacrylamide (3.0 g, 13.5 mmol), methyl acrylate (2.6 mL, 29.0 mmol) and AIBN (31.6 mg, 0.192 mmol) were dissolved into dimethylformamide (24 mL) in a flame-dried Schlenk flask. After sparging with argon for 15 min at room temperature, the flask was placed into a 70° C. oil bath for 2 d. The reaction mixture became a viscous solution.

The flask was removed from the oil bath and 1 mL of methanol was added to quench the reaction. To the cooled reaction was added dichloromethane (~10 mL) for dilution. The solution was then poured into a 1% aqueous HCl solution («100 mL) to precipitate a white polymer. The product was reprecipitated three additional times in dichloromethane/ether. Sonication along with minimal methanol was often necessary to solubilize the polymer. The product was dried in vacuo for two nights yielding 4.5 g (58%) of pure polymer.

Figure 3A:
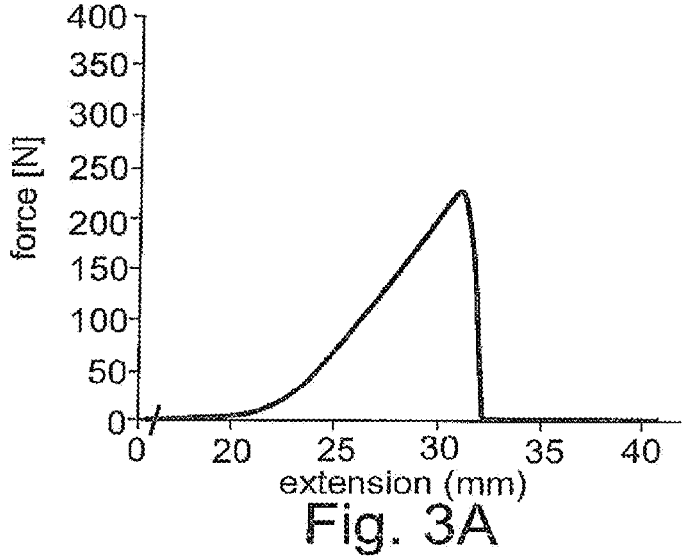
FIG. 3A shows a force vs. extension plot of an adhesive composition according to Comparative Example 3.

The resulting polymer was tested according to Comparative Example 1 without addition of any additives. The results of the force vs. extension test are shown in the graph of FIG. 3A. As is shown therein, the polymer with no additive exhibits characteristic brittle fracture, similar to the acrylic acid polymer system of Comparative Example 1 (FIG. 5).

Comparative Example 4

Comparative Example 4 was prepared and tested in accordance to Comparative Example 3, with the exception that 15 μL of an ethylene glycol solution has been added to the polymer solution upon deposition onto the adherends, resulting in a molar amount of ethylene glycol of 45 mol % (relative to methyl acrylate).

Figure 3B:
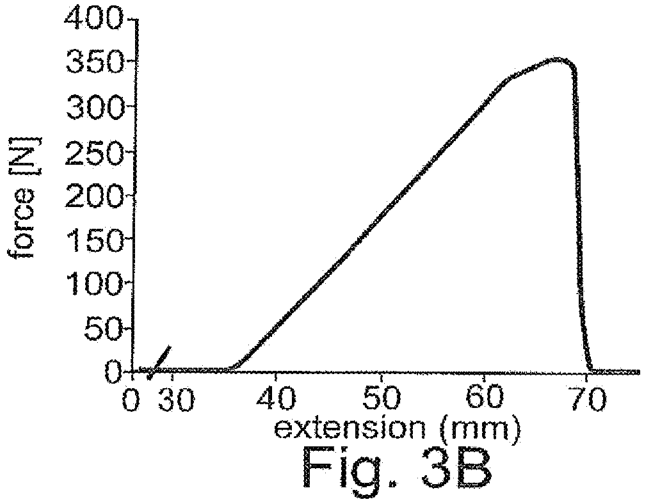
FIG. 3B shows a force vs. extension plot of an adhesive composition according to Comparative Example 4 of the present invention.

As is shown in FIG. 3B, addition of 45% ethylene glycol results in a more rounded curve, indicating a transition to a more ductile material. However, the mechanical strength is seemingly unaffected by addition of ethylene glycol where the strength of the polymer alone (1.86±0.45 MPa) is extremely close to that after addition of ethylene glycol (2.03±0.59 MPa). It is conceivable that minimal hydrogen bonding can occur between ethylene glycol and the hydrogen bond-accepting (but not hydrogen bond-donating) methyl ester group and merely enables the transition from brittle to more ductile without strengthening the material.

Comparative Example 5

Comparative Example 5 was prepared and tested in accordance to Comparative Example 4, with the exception that 15 μL of a dimethoxyethane solution (instead of ethylene glycol) has been added to the polymer solution upon deposition onto the adherends, resulting in a molar amount of dimethoxyethane of 45 mol % (relative to methyl acrylate).

Figure 3C:
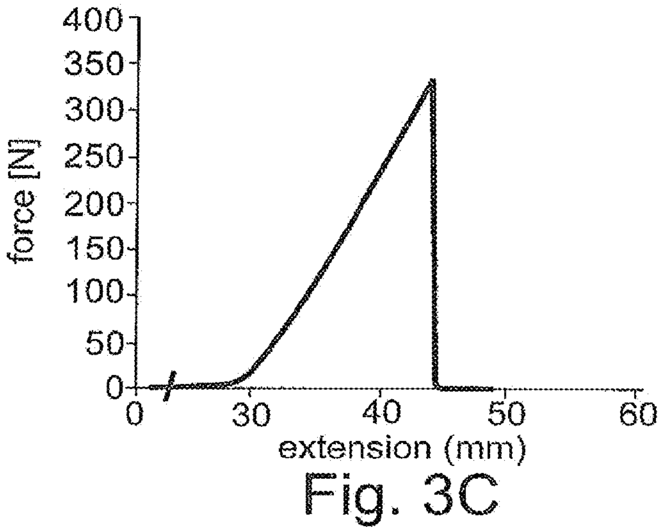
FIG. 3C shows a force vs. extension plot of an adhesive composition according to Comparative Example 5.

As is illustrated by FIG. 3C, addition of dimethoxyethane to the poly {[dopamine methacrylamide]-co-[methyl methacrylate]} polymer produced little effect as dimethoxyethane is incapable of hydrogen bonding. No strengthening of the material was observed (2.37±1.05 MPa), nor was there a change in the behaviour of the force versus extension curve for this material, which exhibited a brittle break and therefore, this minimal effect on the material's properties.

Comparative Example 6

The addition of a polyamine, spermine, was used to probe the effects on adhesion in the poly {[dopamine methacrylamide]-co-[acrylic acid]} polymer as synthesized in Comparative Example 1 in order to study the interactions between the acrylic carboxylic acids and the amine moieties of spermine. Comparative Example 6 was prepared and tested in accordance to Example 1, with the exception that 15 μL of a spermine solution has been added to the polymer solution upon deposition onto the adherends (instead of ethylene glycol), resulting in a molar amount of spermine of 45 mol % (relative to acrylic acid).

The addition of spermine did not produce the same effect as that of ethylene glycol. While the strength of the material increased (2.24±0.27 MPa), the material exhibited brittle failure. It is conceivable that the formation of ammonium-carboxylate bonds through proton transfer results in brittle over ductile behavior.

As has been shown above, using a novel biomimetic copolymer featuring breakable bonds, a strategy to simultaneously enhance the ductility and strength of adhesive polymers has been thus identified.

Once given the above disclosure, many other features, modifications, and improvements will become apparent to the skilled artisan.

The invention claimed is:

1. A method of manufacturing an adhesive composition comprising:

copolymerizing a first co-monomer selected from one of dopamine methacrylamide, 3,4-dihydroxyphenylalanine, or 3,4-dihydroxystyrene, and a second co-monomer comprising a pendant first functional group to result in a copolymer, wherein the second co-monomer is tert-butyl acrylate, methacrylic acid or acrylic acid present in a proportion of about 50 mol % to about 90 mol %;

dissolving the copolymer in a first solvent to form a first solution; and, either dissolving a first additive in a second solvent to form a second solution, the first additive comprising a diol comprising 1 to 12 carbon atoms and hydroxyl functional groups, each of which are capable of forming neutral hydrogen bonds with the first functional groups of different copolymer chains, wherein the neutral hydrogen bonds are formed between functional groups which are capable of both functioning as hydrogen bond donors and acceptors, and mixing the first and second solutions; or adding a metal ion to the first solution, the metal ion capable of interlinking the first functional groups of different copolymer chains through a ligand-metal-ligand bond, the first functional groups forming the ligands;

wherein in the neutral hydrogen bonds the following relationship is met: $\Delta pK_a = pK_a\ (DH) - pK_a\ (AH+) > 0$, wherein $pK_a$ (DH) is the $pK_a$ value of the hydrogen bond donor and $pK_a$ (AH+) is the $pK_a$ value of the hydrogen bond acceptor.

2. The method of claim 1, wherein the one of dopamine methacrylamide, 3,4-dihydroxyphenylalanine, or 3,4-dihydroxystyrene is present in a proportion of about 10 mol % to about 50 mol %.

3. The method of claim 1, wherein the first co-monomer is dopamine methacrylamide.

4. The method of claim 1, wherein $\Delta pK_a$ is between 2 and 18.

5. The method of claim 1, wherein the first functional group is a carboxylic acid.

6. The method of claim 1, wherein the first additive is ethylene glycol.

7. The method of claim 1, wherein one of the first additive is present in a proportion of about 10 mol % to about 70 mol % with respect to the molar amount of the second co-monomer.

8. The method of claim 1, wherein the metal ion is selected from an ion of Cu, Cd, Co, Ni, Fe, Zn, Ag, Mn or Cr.

9. The method of claim 1, wherein the first solvent, the second solvent, or both the first and second solvents comprise dimethylformamide or dichloromethane.

10. The method of claim 1, further comprising curing the adhesive composition, after application on at least one adherend, at room temperature or a temperature between about 30° C. to about 80° C.

11. A method of manufacturing an adhesive composition comprising:

copolymerizing a first co-monomer selected from one of dopamine methacrylamide, 3,4-dihydroxyphenylalanine, or 3,4-dihydroxystyrene, and a second co-monomer comprising a pendant first functional group to result in a copolymer, wherein the second co-monomer is tert-butyl acrylate, methacrylic acid or acrylic acid;

dissolving the copolymer in a first solvent to form a first solution; and, either:

dissolving a first additive in a second solvent to form a second solution and mixing the first and second solutions, wherein the first additive comprises a diol comprising 1 to 12 carbons and hydroxyl functional groups, each of which are capable of forming neutral hydrogen bonds with the first functional groups of different copolymer chains, and wherein the neutral hydrogen bonds are capable of both functioning as hydrogen bond donors and acceptors; or adding a metal ion to the first solution, the metal ion capable of interlinking the first functional groups of different copolymer chains through a ligand-metal-ligand bond;

wherein:

if the first additive is dissolved in the second solvent and the first and second solutions are mixed, at least two of the first functional groups of different copolymer chains interlink non-covalently via a neutral hydrogen bond formed between the first functional groups of the interlinked first and second copolymer chains, wherein in the neutral hydrogen bond the following relationship is met: $\Delta pK_a = pK_a\ (DH) - pK_a\ (AH^+) > 0$, wherein $pK_a$ (DH) is the $pK_a$ value of a hydrogen bond donor and $pK_a$ ($AH^+$) is the $pK_a$ value of a hydrogen bond acceptor; or if the metal ion is added to the first solution, at least two of the first functional groups of different copolymer chains interlink non-covalently via a ligand-metal-ligand bond and the first functional groups form the ligands thereof.

12. A method of manufacturing an adhesive composition comprising:

copolymerizing a first co-monomer selected from one of dopamine methacrylamide, 3,4-dihydroxyphenylalanine, or 3,4-dihydroxystyrene, and a second co-monomer comprising a pendant first functional group to result in a copolymer, wherein the second co-monomer is tert-butyl acrylate, methacrylic acid or acrylic acid present in a proportion of about 50 mol % to about 90 mol %;

dissolving the copolymer in a first solvent to form a first solution; and dissolving ethylene glycol in a second solvent to form a second solution, the ethylene glycol comprising hydroxyl functional groups, each of which are capable of forming neutral hydrogen bonds with the first functional groups of different copolymer chains;

wherein the neutral hydrogen bonds are formed between functional groups which are capable of both functioning as hydrogen bond donors and acceptors, and mixing the first and second solutions, and wherein in the neutral hydrogen bonds the following relationship is met: $\Delta pK_a = pK_a\ (DH) - pK_a\ (AH+) > 0$, wherein $pK_a$ (DH) is the $pK_a$ value of the hydrogen bond donor and $pK_a$ (AH+) is the $pK_a$ value of the hydrogen bond acceptor.

* * * * *